(12) United States Patent
Rosa

(10) Patent No.: US 7,533,678 B2
(45) Date of Patent: May 19, 2009

(54) WASHING DEVICE FOR SPRAY GUNS AND THEIR COMPONENTS EQUIPPED WITH SEPARATE AUTOMATIC AND MANUAL WASHING ZONES

(75) Inventor: Giuseppe Rosa, Montorso (IT)

(73) Assignee: Rosauto S.R.L., Montebello Vicentino (Vicenza) (IT)

( * ) Notice: Subject to any disclaimer, the term of this patent is extended or adjusted under 35 U.S.C. 154(b) by 567 days.

(21) Appl. No.: 11/135,676

(22) Filed: May 24, 2005

(65) Prior Publication Data

US 2005/0268949 A1    Dec. 8, 2005

(30) Foreign Application Priority Data

Jun. 3, 2004    (IT) ........................ MI2004A1118

(51) Int. Cl.
*B08B 3/00* (2006.01)
*B08B 3/04* (2006.01)

(52) U.S. Cl. .................... 134/111; 134/104.1; 134/170; 134/171; 134/200

(58) Field of Classification Search ................ 134/104, 134/111, 170, 171, 200, 104.1
See application file for complete search history.

(56) References Cited

U.S. PATENT DOCUMENTS

| 3,771,539 | A | * | 11/1973 | De Santis | .................... 134/111 |
| 3,884,179 | A | * | 5/1975 | Szczepanski | .................. 118/70 |
| 5,232,299 | A | * | 8/1993 | Hiss | ........................... 401/143 |
| 6,003,530 | A | * | 12/1999 | Giuseppe | .................. 134/102.1 |
| 6,554,009 | B1 | * | 4/2003 | Beijbom et al. | ............. 134/95.3 |
| 2004/0031507 | A1 | * | 2/2004 | Ross et al. | ................... 134/123 |

FOREIGN PATENT DOCUMENTS

EP    0 443 421 A1    8/1991

* cited by examiner

*Primary Examiner*—Michael Barr
*Assistant Examiner*—Rita R Patel
(74) *Attorney, Agent, or Firm*—James V. Costigan; Hedman & Costigan, P.C.

(57) ABSTRACT

A washing device (1) for spray guns (16) and their components (16', 16") equipped with separate automatic (6) and manual (7) washing zones, comprises a boxed casing (2) suitable for housing in its interior a washing zone (3) and a collection and feeding zone (4). According to the invention, said device is characterized in that the washing zone is subdivided into a first zone (6) for automatic washing, and at least a second zone (7) for manual washing, and in that a swinging separation door (29), hinged on top by hinges (30) to the structure of the boxed casing (2), separates said two washing zones (6, 7) from each other.

14 Claims, 3 Drawing Sheets

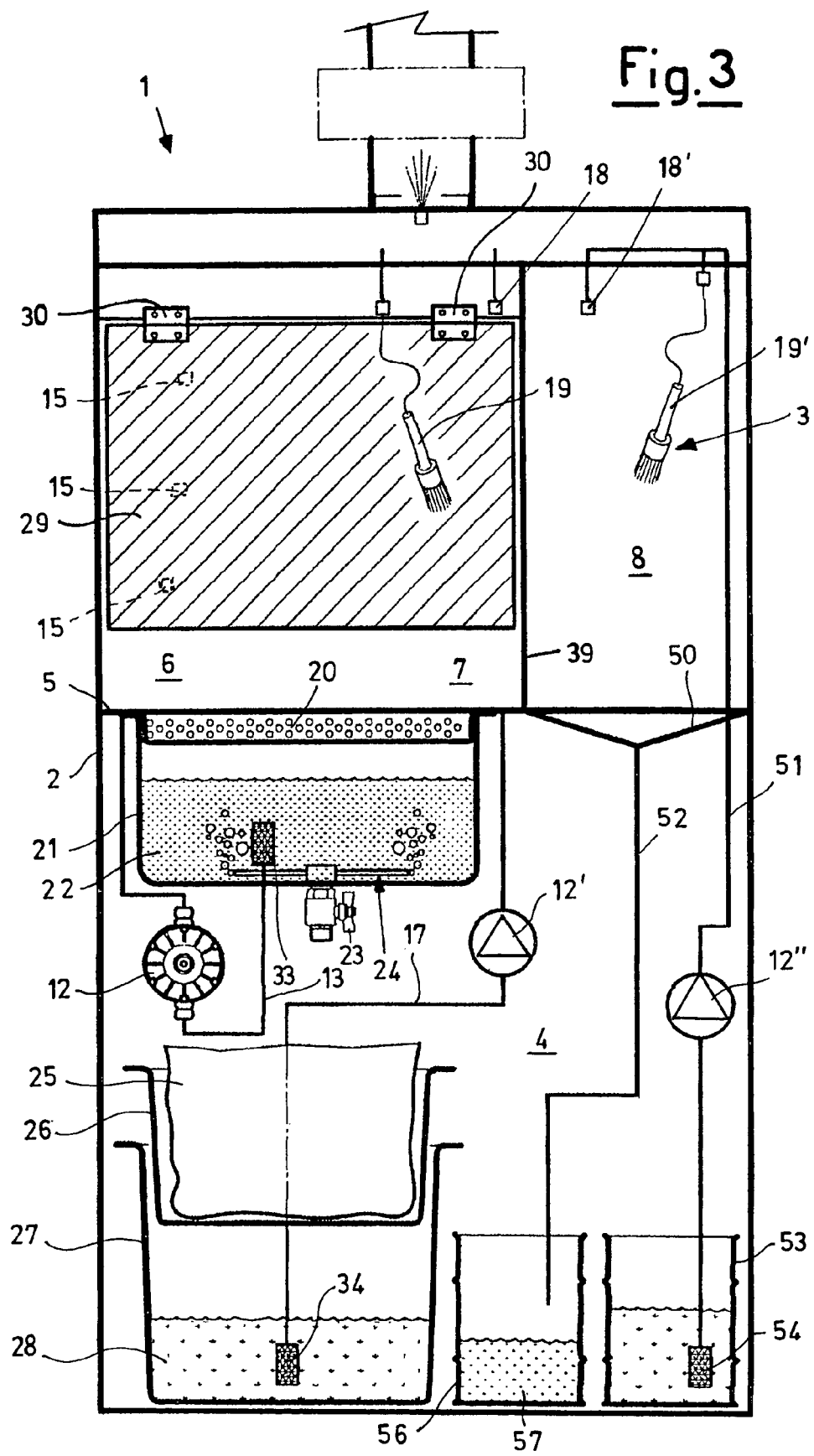

WASHING DEVICE FOR SPRAY GUNS AND THEIR COMPONENTS EQUIPPED WITH SEPARATE AUTOMATIC AND MANUAL WASHING ZONES

The present invention relates to a washing device for spray guns and their components, equipped with automatic and manual washing zones.

In the field of painting spray guns, of the bucket or direct suction type, are known for the application of paints or similar materials on a wide variety of products.

In particular, in the bucket type, a spray gun mixes compressed air with the paint fed from a container, or bucket. The compressed air jet allows atomized paint to be sprayed externally. The air flow is controlled by a lever situated on the gun handle.

For these types of guns the washing phase after use is particularly important in order to eliminate dregs and traces of paint when they are still damp, to guarantee an optimum functioning when the gun is re-used.

A known technique which is currently widely used is the use of a washing device comprising a tank, equipped with a cover, in which the gun to be washed is placed. In the tank, around the gun, there are numerous nozzles which spray washing liquid onto all the parts of the gun itself. Conical nozzles whose flow is sent in all directions, are normally present.

The spray gun is placed in a suitable position and a washing nozzle is inserted in a paint feeding channel which connects the gun with the bucket.

The bucket is previously dismantled and removed from the gun so that it can also be positioned in the washing device.

To complete the washing of the gun and its components, it is preferable however to effect not only an automatic washing but also a final manual passage so as to remove any possible dregs remaining in points difficult to reach.

It also often happens that the paint dries in a certain area creating residues which are particularly adherent to the apparatus and which cannot be removed by the automatic and manual use of washing water alone.

It is therefore convenient to provide a device which envisages manual washing, automatic washing and a possible decrusting washing for persistent residues, in addition to the possibility of collecting and re-using the washing liquid, in the modes preferred by the user.

When operating with the above devices, the operator must be protected with conventional individual means such as masks and glasses to prevent jets of dirty water and/or solvents mixed with paint residues from being sprayed into the eyes, mouth, respiratory apparatus and in general exposed parts of the operator.

According to current regulations, it is obligatory however for the device itself to be equipped with protective means for the operator, so that a careless or distracted operator, operating without the necessary individual protective means is in any case protected.

A general objective of the present invention is to provide a device for spray guns and their components equipped with separate automatic and manual washing zones having separation and safety means for the operator.

A further objective of the present invention is to provide a device whose separation and safety means do not require costly and complex driving and control equipment. Another objective of the invention is to provide an extremely simple, economical and particularly functional washing device.

In view of the above objectives, according to the present invention, a washing device for spray guns and their components has been conceived, equipped with separate automatic and manual washing zones, having the characteristics specified in the enclosed claims.

The structural and functional characteristics of the present invention and its advantages with respect to the known art will appear more evident from an examination of the following description, referring to the enclosed schematic drawings, in which:

FIG. 3 shows a sectional schematic front view of a washing device according to a different embodiment of the invention in an operating phase.

Figure 1:
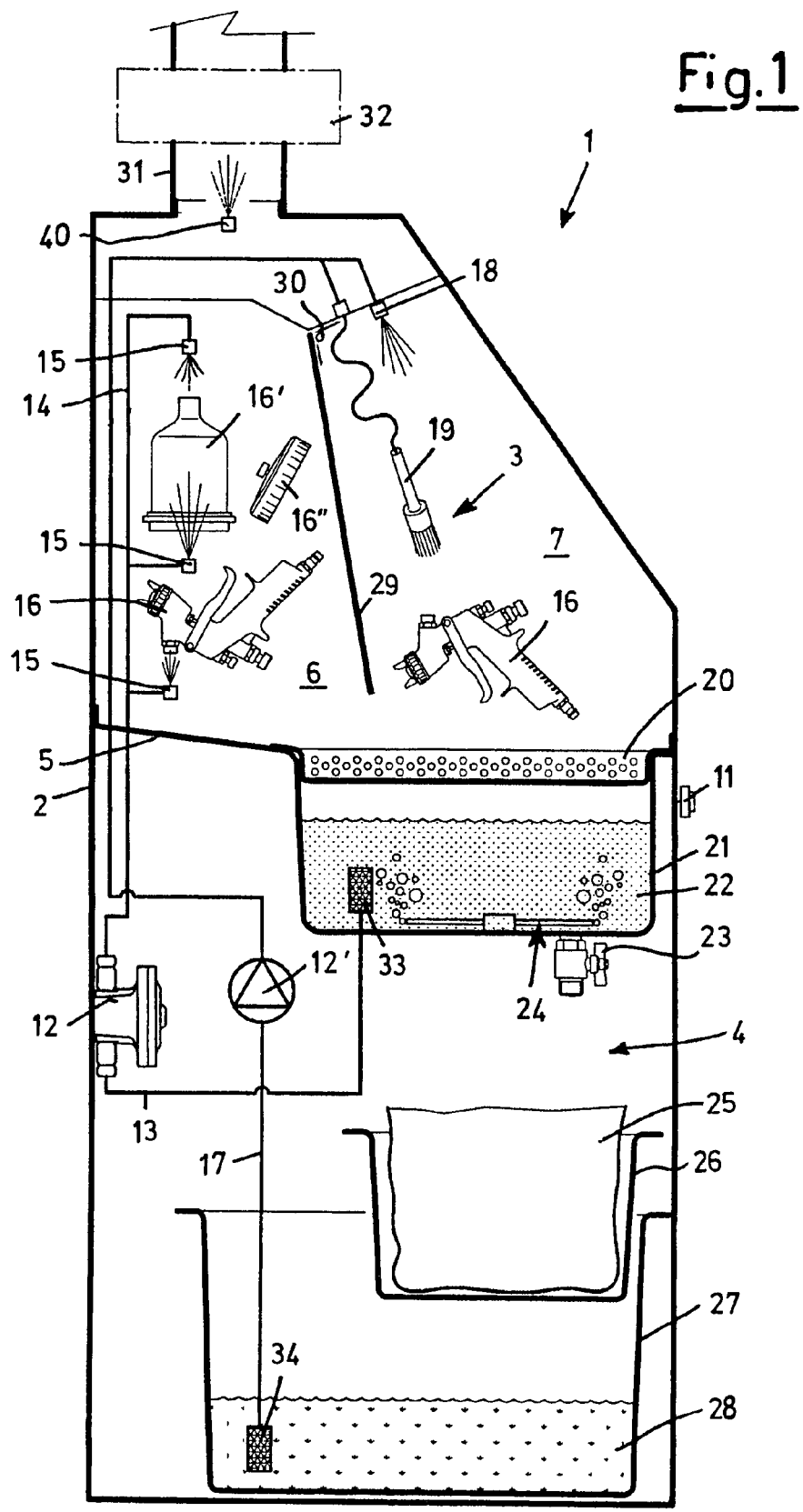
FIG. 1 shows a sectional schematic side view of a washing device according to an embodiment of the invention in an operating phase.
Figure 2:
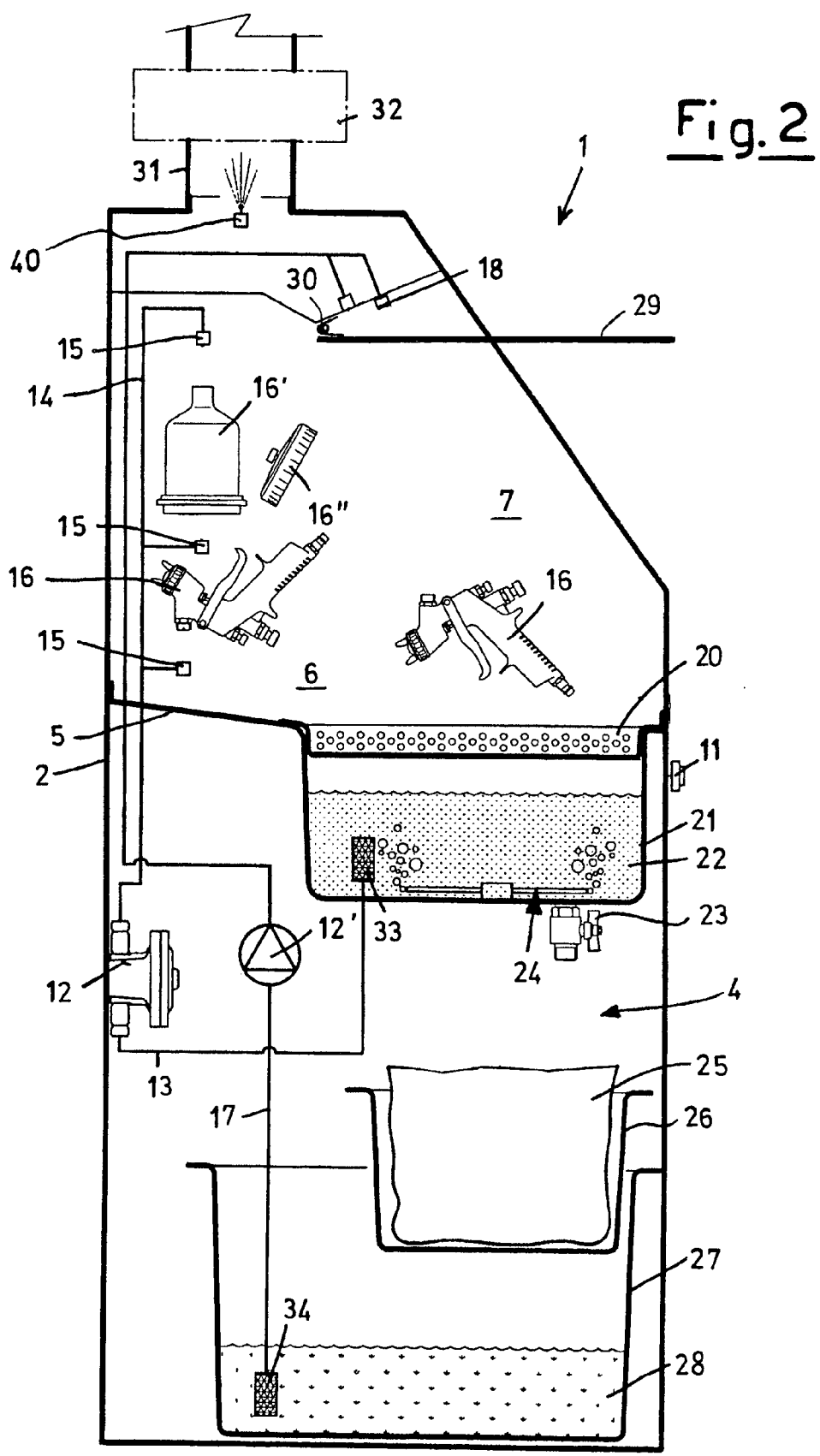
FIG. 2 shows a sectional schematic side view of the device of FIG. 1 in a non-operating phase.

With reference to FIGS. 1 and 2, a washing device is indicated as a whole with 1, and in the example illustrated, according to the present invention, comprises a boxed casing 2 of the device equipped with a water-tight closure, preferably in the front.

The device has an upper washing zone 3 and a lower collection and feeding zone 4 which are separated from each other.

The washing zone 3 is separated from the collection and feeding zone 4 by a septum 5 fixed to the boxed casing 2 and integral with a collection tank 21 of the dirty water (recovered) 22.

A gridded or perforated surface 20 which acts as a support for the elements to be washed and for draining the liquid towards the underlying collection tank, rests firmly and removably on the collection tank 21.

Alternatively, when the device is used for the washing of spraying equipment with paints based on an organic solvent, the collection tank 21 and the various devices connected thereto may not be necessary as a clean solvent container can be sufficient for the feeding together with a used i.e. dirty solvent container.

In any case, the present invention can also be perfectly adapted without any further inventive effort to this different device.

Coming back to FIG. 1, the washing zone 3 is further subdivided into a first internal zone 6 and a second zone 7 close to the closure of the device, separated by a protection door 29.

The door 29 is hinged on the top by means of hinges 30 to the structure of the boxed casing 2 so that it oscillates between an open position which allows access to the first zone 6 and a closed position which separates this area from the second zone 7.

The first zone 6 is suitably arranged with supports for the automatic washing of a gun 16 and its components, such as for example, a bucket 16' and the lid 16".

The first zone 6 is therefore equipped with automatic washing nozzles or ejectors 15, suitably positioned.

The device 1 is also driven by a timer 11 which can be programmed for effecting the automatic washing cycle according to the preferred modes.

The manual washing is, on the contrary, effected in the second zone 7, which for this purpose is equipped with one or more sprayers 18 and possibly a brush 19 fed by liquid for manual washing.

The door 29 is arranged so that it can be lifted by the operator for positioning spray guns and the relative components in the first zone 6 and is then left to swing thanks to its weight to return to the initial closing position.

With the door 29 closed, it is possible to activate the automatic washing without there being any risk of the spraying and projection of particulate onto the operator.

The provision of the swinging door 29 thanks to its weight, avoids the use of complex warning systems and/or blockage switches for the automatic washing zone 7, active when the door is open.

The boxed casing 2 also has a hood configuration above in order to send and remove the vapours generated inside, and at the top, it is equipped with a suction duct 41 of the vapours to be sent into the atmosphere, possibly filtering them by means of a suitable filtering unit 42.

For the introduction of the vapours, there is a blowing device 40 facing outwards at the mouth of the suction duct.

The collection and feeding zone 4 has, starting from above, an upper collection tank 21 which collects the liquid 22 or water used with residues of paint, and which comprises a mixer 24 for the liquid mixture comprising water, paint, and coagulating agent, the latter being introduced into the tank to cause the coagulation or flocculation of the paint for its subsequent separation from the liquid phase.

The collection tank is also equipped with a discharge valve 23.

Under the collection tank 21, there is a filter bag 25 suitable for receiving the liquid or water already used 22 (the water-paint mixture and coagulated paint) to separate the coagulated solid phase.

The filter bag 25 is contained and supported inside a perforated container 26 through which the filtered water 28 passes into the underlying container of clean water 27.

Suction and pumping means such as a first pump 12, preferably with a membrane, are arranged for sucking the mixture of water already used or recovered 22 from the collection tank 21 by means of a line 13, after filtration with a filter 33 for the already used water.

The liquid removed from the collection tank 21, i.e. that already used, is sent by means of a line 14 to the nozzles or ejectors 15 for the automatic washing.

A second pump 12' is also envisaged, connected by means of a clean water duct 17 directly to the clean water container 27.

Said clean water duct 17 has a clean water filter 34 at the end immersed in the water 28 of the clean water container 27.

The clean water duct 17 directly feeds the second manual washing zone 7 and in particular, according to necessity, the brush 19 or sprayers 18, in addition to other devices which can be advantageously contemplated in this area.

With reference to FIG. 3, this illustrates a combined washing device according to a different embodiment of the invention.

The device 1 comprises the boxed casing 2 equipped with a water-tight closure, preferably in the front.

The device has an upper washing zone 3 and a lower collection and feeding zone 4, separated from each other.

The washing zone 3 is separated from the collection and feeding zone 4 by means of a septum 5 fixed to the boxed casing 2 and integral for a portion with a collection tank 21 of the used water (recovered) 22, and for the remaining portion with a draining surface 50.

A gridded or perforated surface 20, which acts as a support for the elements to be washed and for draining the liquid towards the underlying collection tank, rests firmly and removably on the collection tank 21.

The washing zone 3 envisages a first automatic washing zone 6, a second manual washing zone 7, and a third decrusting washing zone 8, said zone 8 being separated from the zone 7 by means of a septum 39.

The first zone 6 is again suitably arranged with supports for the automatic washing.

The manual washing is effected in the second zone 7, whereas a decrusting washing is effected in the third zone 8 with a more active means, to eliminate the solidified residues on the apparatus which could not be eliminated with a water washing alone. A wall 39 separates the third zone 8 from first zone 6 and the second zone 7, as shown in FIG. 3.

In this respect, both the second zone 7 and the third zone 8 each have one or more sprayers respectively 18, 18' and each is possibly equipped with a brush, 19, 19' respectively, fed by liquid for the manual washing.

The first zone 6 is also equipped with automatic washing nozzles or ejectors 15, suitably oriented.

Analogously to the first embodiment, also in this case, the operator can position spray guns and relative components in the first zone 6 and let the door 29 swing, thanks to its weight returning subsequently to its initial closed position, i.e. separating the zones 6, 7.

In correspondence with the first and second zone 6, 7, and starting from above, the collection and feeding zone 4 has an upper collection tank 21 which collects the used water 22 with residues of paint, and which comprises a mixer 24 for the liquid mixture comprising water, paint, and coagulating agent, the latter being introduced into the tank to cause the coagulation or flocculation of the paint for its subsequent separation from the liquid phase.

The collection tank is also equipped with a discharge valve 23.

Below the collection tank 21, there is a filter bag 25 suitable for receiving already used water 22 (for example in the case of water paints, the water-paint mixture and coagulated paint) to separate the coagulated solid phase.

The filter bag 25 is contained and supported inside a perforated container 26 through which the filtered water 28 passes into the underlying clean water container 27.

A first pump 12 is arranged for sucking the mixture of already used or recovered water 22 from the collection tank 21 by means of a line 13, after filtration with a filter 33 for the already used water.

The liquid removed from the collection tank 21, i.e. that already used, is sent from the first pump 12 by means of a line 14 to the nozzles 15 for the automatic washing which is effected in the first zone 6.

A second pump 12' is also envisaged, connected by means of a clean water duct 17 directly to the clean water container 27.

Said clean water duct 17 has a clean water filter 34 at the end immersed in the water 28 of the clean water container 27.

The clean water duct 17 goes to directly feed the second manual washing zone 7 and in particular, according to requirements, the brush 19 or sprayers 18, in addition to further devices which can be advantageously contemplated in this zone.

Beneath the third decrusting washing zone 8, the device envisages a draining surface 50 preferably conical, so as to send the decrusting liquid 57 used towards a discharge duct 52 which sends it to a collection tank 56.

The decrusting solvent is sucked in from a feeding tank 53 by means of a third pump 12" through a suction duct 51 of the decrusting solvent optionally equipped with a filter 54.

Through this duct 51, the solvent reaches the third washing zone 8 to feed the sprayer 18', the possible brush 19', as well as other devices which in said third zone 8 can be advantageously envisaged.

The decrusting solvent to be used is advantageously selected from a very wide range of substances in relation to the operating conditions and type of paints, and consequently the solid residues which must be eliminated.

Said decrusting solvent can, for example, be a mixture of substances, again water-based, or an energetic organic solvent.

Thanks to the provision of feeding and collection tanks differentiated from those of the first and second zone 6, 7 with respect to those relating to the third zone 8.

The suction system alternative to the pumps can also be obtained by means of a system of ejectors of the Venturi type connected to a pressurized air line to suck in the liquid to be fed to the three washing zones 6, 7, 8.

From the above description, with reference to the figures, it is evident how a device equipped with separate automatic and manual washing zones for spray guns and their components according to the invention, is particularly useful and advantageous. The objectives specified in the preamble of the description are therefore achieved.

The forms of the device equipped with separate automatic and manual washing zones for spray guns and their components of the invention can obviously differ from those shown for illustrative and non-limiting purposes in the drawings.

The protection scope of the invention is therefore delimited by the enclosed claims.

The invention claimed is:

1. A washing device (1) for spray guns (16) and their components (16', 16") equipped with a washing zone (3) comprising separate automatic (6), manual (7) and manual decrusting (8) washing zones, comprising a boxed casing (2) suitable for housing in its interior a washing zone (3) and a collection and feeding zone (4), and having a swinging separation door (29) mounted within said boxed casing (2) to separate said automatic (6) and manual (7) washing zones, said swinging separation door (29) being adapted to swing outward from said boxed casing (2) to allow access to said automatic (6) washing zone from outside of said housing, said swinging separation door (29) being hinged on top by hinges (30) to the structure of the boxed casing (2), said boxed casing (2) having a septum (5) having a perforated surface (20) located within said boxed casing (2) to separate said washing zone (3) from a collection and feeding zone (4).

2. The washing device (1) according to claim 1, characterized in that said door (29) is weighted so that it swings from an open position which allows access to the automatic washing zone (6) to a closed position which separates said zone from the manual (7) washing zone.

3. The washing device (1) according to claim 1, characterized in that said device (1) is also equipped with a programmable timer (11) for effecting the automatic washing cycle according to the preferred modes.

4. The washing device (1) according to claim 1, characterized in that the collection zone (4) comprises a collection tank (21) which collects the used washing liquid (22) and, situated below said collection tank (21), a filter bag (25) suitable for receiving the used washing liquid (22) to separate its solid components and transfer the filtered liquid (28) to a clean liquid container (27), said washing device also being equipped with suction means suitable for removing the used (22) or clean (28) liquid from the collection tank (21) or clean liquid container (27) respectively, and sending it to the automatic (6) and manual (7) washing zones.

5. The washing device (1) according to claim 4, characterized in that said suction means comprise a first membrane pump (12) arranged for sucking the used water (22) from the collection tank (21) by means of a line (13) after filtration through a water filter (33) to obtain filtered water before sending said filtered water to said automatic washing zone (6).

6. The washing device (1) according to claim 5, characterized in that said line (13) feeds the used water (22) from the collection tank (21) to a series of automatic washing nozzles (15), controlled by a timer.

7. The washing device (1) according to claim 6, characterized in that said suction means comprise a second pump (12') connected by means of a clean water duct (17) directly to said clean water container (27).

8. The washing device (1) according to claim 7, characterized in that said second pump (12') directly feeds manual washing zone (7) and optionally, a brush (19) or sprayers (18),.

9. The multiple washing device (1) according to claim 4, characterized in that said suction means comprise at least one ejector system of the Venturi type connected to a pressurized air line for sucking in the liquid to be fed to at least one of the automatic washing zone (6), the manual washing zone (7) or the manual decrusting washing zone (8).

10. The washing device (1) according to claim 1, characterized in that said collection zone (4) has feeding and collection tanks differentiated from those serving with respect to those serving the manual decrusting washing zone (8).

11. The multiple washing device (1) according to claim 10, characterized in that beneath the manual decrusting washing zone (8), there is a draining surface (50) suitable for sending used decrusting washing liquid (57) towards a collection tank (56).

12. The washing device (1) according to claim 11, characterized in that it is also equipped with suction means suitable for removing a decrusting solvent from a feeding tank (53) through a suction duct (51) of the decrusting solvent optionally equipped with a filter (54).

13. The washing device (1) according to claim 12, characterized in that a third pump (12") is provided for feeding said manual decrusting washing zone (8) through a suction duct (51) for decrusting solvent, said suction duct (51) being optionally equipped with a filter (54).

14. A washing device (1) for spray guns (16) and their components (16', 16") equipped with separate automatic (6) and manual (7) washing zones, comprising a boxed casing (2) suitable for housing in its interior a washing zone (3) and a collection and feeding zone (4), and having a swinging separation door (29), hinged on top by hinges (30) to the structure of the boxed casing (2), said swinging operation door (29) being adapted to separate said automatic (6) and manual (7) washing zones, said swing operation door being weighted so that it swings from an open position which allows access to the automatic washing zone (6) to a closed position which separates said zone from the manual (7) washing zone, said device also comprising a manual decrusting washing zone (8) that is formed by a wall (39) in said boxed casing which separates said decrusting zone (8) from said automatic (6) and manual (7) washing zones.

* * * * *